United States Patent [19]

Terentiev et al.

[11] Patent Number: 5,567,672

[45] Date of Patent: Oct. 22, 1996

[54] METHOD AND APPARATUS FOR DAMPING MECHANICAL VIBRATION WITH A HIGH TC SUPERCONDUCTOR

[75] Inventors: Alexander N. Terentiev; John P. Harrison, both of Kingston, Canada

[73] Assignee: Queen's University at Kingston, Kingston, Canada

[21] Appl. No.: 320,638

[22] Filed: Oct. 11, 1994

[51] Int. Cl.[6] .............................. H02K 5/24; H02K 7/09
[52] U.S. Cl. .......................... 505/166; 310/51; 310/90.5
[58] Field of Search ..................... 310/90.5, 51; 505/166

[56] References Cited

U.S. PATENT DOCUMENTS 5,314,868  5/1994  Takahata et al. ..................... 310/90.5

OTHER PUBLICATIONS

Baar, D. J.; Graham, S.; Harrison, J. P.; Flux line pinning in Y Ba2 Cu3 O7–delta observed with a vibrating bar., Meeting Info.: International Conference on Critical Currents in High Temperature Superconductors, abstract.

Primary Examiner—Clayton E. LaBalle
Attorney, Agent, or Firm—Richard J. Hicks

[57] ABSTRACT

A method and apparatus for damping vibrations in high Tc superconducting magnetic levitation bearings and the like is described. By controlling the temperature of the superconducting material at the "energy dissipation peak", which is a few degrees below the temperature of the transition to the superconducting state, a damping effect can be switched on or off as required.

16 Claims, 6 Drawing Sheets

METHOD AND APPARATUS FOR DAMPING MECHANICAL VIBRATION WITH A HIGH TC SUPERCONDUCTOR

FIELD OF THE INVENTION

This invention relates to damping of mechanical vibration of magnetic bearings and the like with high Tc superconducting materials.

BACKGROUND OF THE INVENTION

High Tc superconducting magnetic bearings are generally, but not essentially, constructed with a superconducting stator element which is maintained at a temperature below or about 77K with liquid nitrogen and a levitated permanent magnet rotor element. The bearing load is determined by the critical current density which in turn depends upon the motion of magnetic flux lines. At about 77K the flux lines within a high Tc superconducting material can be pinned strongly to fixed positions, and recent advances in pinning technology have been successful in raising the load capacity of superconducting bearings considerably. Vibration of the bearing causes vibrational movement of the rotor relative to the stator. The magnetic field of the permanent magnet rotor is highly inhomogeneous and consequently the vibration creates an AC field in the superconductor. This AC field can cause the flux lines in the stator to depin and move. Moving flux lines dissipate energy and hence the load capacity of the bearing is reduced. However, as the load capacity increases the capacity for damping is reduced considerably, especially at low vibrational amplitudes. The dissipation of energy in high Tc superconductors induced by an AC magnetic field is the result of the movement (depinning) of the flux lines. It is known (J. Supercond. 6 (1993) 201. E. H. Brandt) that high Tc superconductors have a non-monotonic temperature dependence of energy dissipation. At low temperatures (of the order of 50–55K) the flux lines are pinned and the AC field can only induce the motion of flux lines inside the potential well, which leads to very low energy dissipation. At this limit, flux motion occurs only at a thin surface layer. At high temperatures, of the order of 91–92K but still below Tc, the flux lines are completely mobile due to strong thermal fluctuations. In this situation flux motion occurs throughout the material; however, since the pinning is weak the flux lines are subjected to very weak drag forces resulting in low AC losses. It has been discovered, however, that between these temperature limits there is a very narrow temperature range in which the flux lines are weakly pinned but flux motion induced by the AC field reaches the center of the superconducting sample. This range corresponds to a maximum in energy dissipation by AC losses. Therefore, by controlling the temperature of a high Tc superconducting damping element within a very narrow range, it is possible to switch on or switch off a vibrational damping effect in the bearing or other magnetic levitation device.

OBJECT OF INVENTION

Thus, it is one object of the present invention to provide a method for damping mechanical vibration in a high temperature superconducting material magnetic levitation device such as a bearing, without dissipation of rotational or translational energy.

Another object of the present invention is to provide a magnetic levitation device or any system having improved mechanical vibration damping characteristics.

BRIEF STATEMENT OF INVENTION

By a broad aspect of this invention there is provided a system for damping mechanical vibrations in a structure comprising:

permanent magnet means mounted on said structure;

a high Tc superconducting element mounted adjacent said permanent magnet;

heating and cooling means in thermal contact with said superconducting element;

means to generate signals representative of mechanical vibrations in said structure; means to activate said heating and cooling means in response to said signals to thereby control said superconducting element in a temperature range below the Tc of said element corresponding to an energy dissipation peak for said element, so as to rapidly dissipate vibrational energy from said structure.

By a preferred aspect of this invention there is provided a method for damping vibrations in a structure comprising:

incorporating a high Tc superconducting element into said structure;

sensing said vibrations and controlling temperature in said superconducting element to a temperature range corresponding to an energy dissipation peak, which is below a transition temperature to a superconducting state, in response to said sensing step.

By another aspect of this invention there is provided a damped magnetic levitation bearing system in a vacuum vessel comprising:

a rotatable member having a rotation axis in a central shaft, said shaft having a first permanent magnet rotor mounted thereon and supported by an adjacent first superconducting stator element in spaced relation thereto; second permanent magnet means mounted on at least one end of said shaft;

a high Tc second superconducting element mounted, in spaced relationship to said second permanent magnet means, on thermally conducting, electrically insulating mounting means;

heating and cooling means in thermal contact with said mounting means;

means to detect mechanical vibrations in said shaft and generate a signal representative thereof;

and means to activate said heating and cooling means in response to said signal so as to control said second superconducting element in a temperature range, below the Tc of said second superconducting element, corresponding to an energy dissipation peak for said second superconducting element, so as to rapidly dissipate vibrational energy from said structure.

By yet another aspect of this invention there is provided a damped magnetic levitation system comprising:

a levitated platform means;

first permanent magnet means mounted on said levitated platform means;

a cryogenic vessel arranged adjacent but spaced said first permanent magnet means, and containing first superconducting means in spaced overlying relationship to said first permanent magnet means so as to provide a lifting force for said platform means;

said first superconducting means being mounted on thermal link means in said vessel;

second permanent magnet means mounted on said platform means;

high Tc second superconducting means in said vessel arranged in overlying spaced relationship to said second permanent magnet means, mounted on a thermally conducting electrically insulating mounting means which in turn is mounted by a thermal link in said vessel;

means to heat and cool said thermally conducting and electrically insulating mounting means; means to detect mechanical vibrations in said levitated platform and generate a signal representative thereof; and means to activate said heating and cooling means in response to said signal so as to control said second superconducting element in a temperature range, below the Tc of said second element, corresponding to an energy dissipation peak for said second superconducting element, so as to rapidly dissipate vibrational energy from said levitated platform.

DETAILED DESCRIPTION OF PREFERRED EMBODIMENTS

This invention relates specifically to high Tc superconductions (HTSC) of the Yttrium-Barium Copper Oxide (YBCO) type and more particularly to melt processed HTSC's where recent progress in increasing the pinning of the flux lines therethrough has resulted in markedly improved load bearing capacity in vacuum magnetic levitation bearings. Other examples of HTSC materials include Bismuth-Strontium-Calcium-Copper Oxide (BSCCO) and the Thallium or Mercury Copper Oxide compounds.

Figure 1:
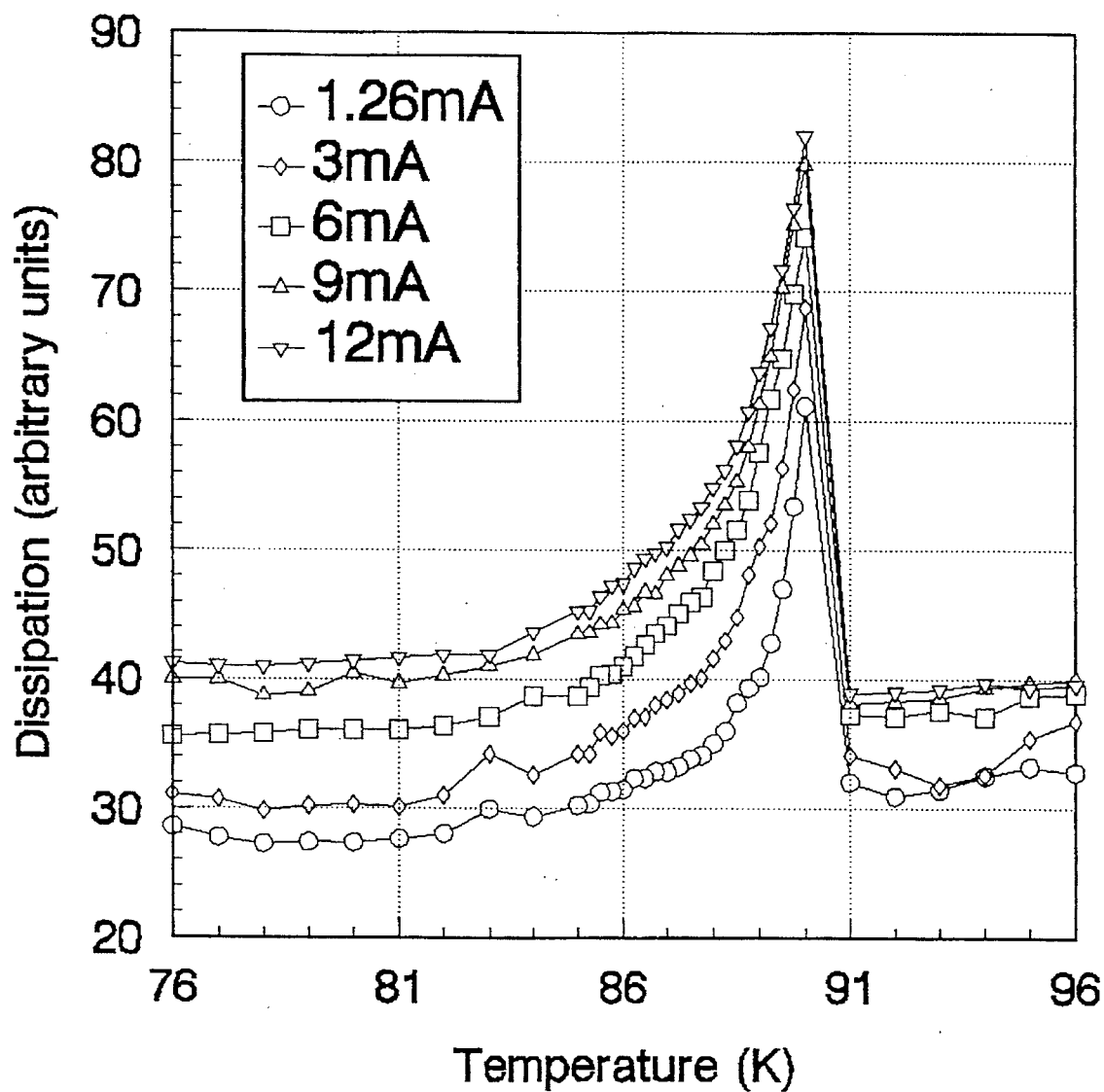
FIG. 1 is a graph showing energy dissipation curves for a YBCO single crystal in a magnetic field of 0.5 Tesla parallel to the c axis of the crystal.
Figure 2:
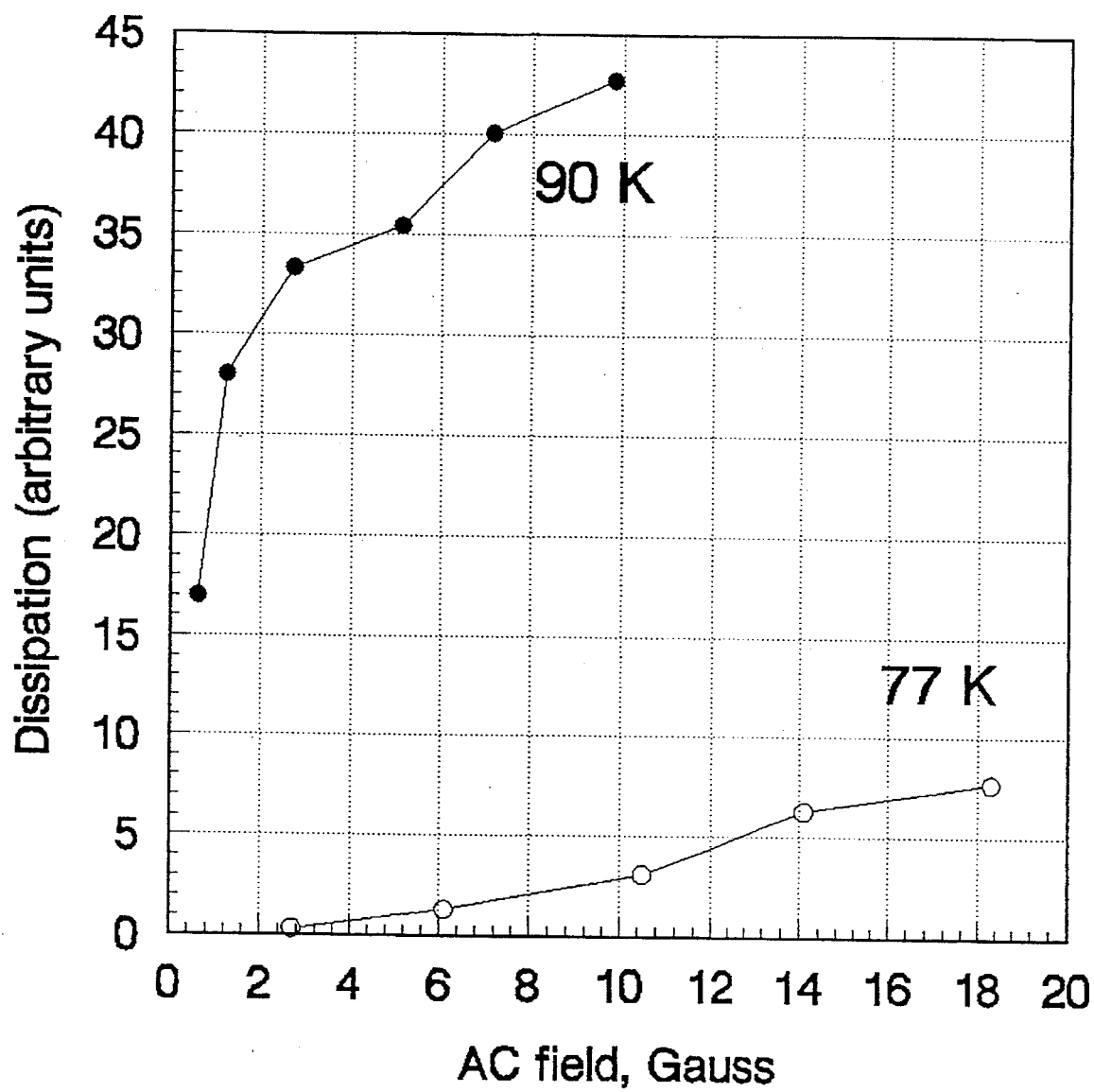
FIG. 2 is a graph illustrating dissipation for a peak at 90K and at 77K as a function of applied alternating magnetic field.

In order to simulate mechanical vibration in an HTSC bearing, two separate experiments were devised. In the first experiment a 22 mg twinned single crystal of YBCO having Tc=91.9K was glued to an insulating beam suspended from two pairs of cupronickel wires and placed in a homogeneous, vertical, magnetic field of 0.5T. One of the pairs of cupronickel wires carried an AC current which drove the insulating beam into oscillation (a swinging motion), while the other generated a pick up voltage proportional to the amplitude of the oscillation. By stepping the frequency of the drive current, the resonance response could be measured and the energy dissipation determined. The superconductor was, of course, contained in a vessel the temperature of which could be controlled, by addition of liquid nitrogen, from above Tc in 0.2K intervals with a temperature stability of 25 mK. Dissipation of energy in the regime of the peak at about 90K was compared with that at 77K. Dissipation at the peak simulated the damping element while that at 77K simulated the levitation element. The experiment was performed for a range of magnitude of drive currents to produce a range of AC magnetic fields. The AC field was determined from the pick up voltage and the known geometry of the experiment. The dissipation curves are shown in FIG. 1. The dissipation well above the transition temperature is not connected with the YCBO sample but is a function of the properties of the beam and the wires supporting the beam. The sharp increase in dissipation corresponds to a drop in the resistivity of the YBCO sample. The dissipation curves have a characteristic peak at about 90K which does not depend on the driving force. At 77K dissipation was higher than the background dissipation of the beam itself, which means that the superconductor still dissipates energy at 77K, but the amount of dissipation is much lower than the peak dissipation. In FIG. 2, the AC field dependence of the dissipation in the superconductor is presented for two different temperatures, 77K (liquid nitrogen) and 90K (dissipation peak temperature). For the same values of AC field the peak dissipation is higher than the dissipation at 77K by a factor of 10 or more in the range of AC field 0–10 Gauss. As the usual value of the gradient of magnetic field near the surface of the permanent magnet rotor is about 2000 G/cm, the maximum AC field of 10G in this experiment corresponds to a mechanical vibration amplitude of the magnet of 50 μm. Thus, it is clear that large amplitude vibrations can be effectively damped by controlling the temperature of a high Tc superconducting damping element.

Figure 3:
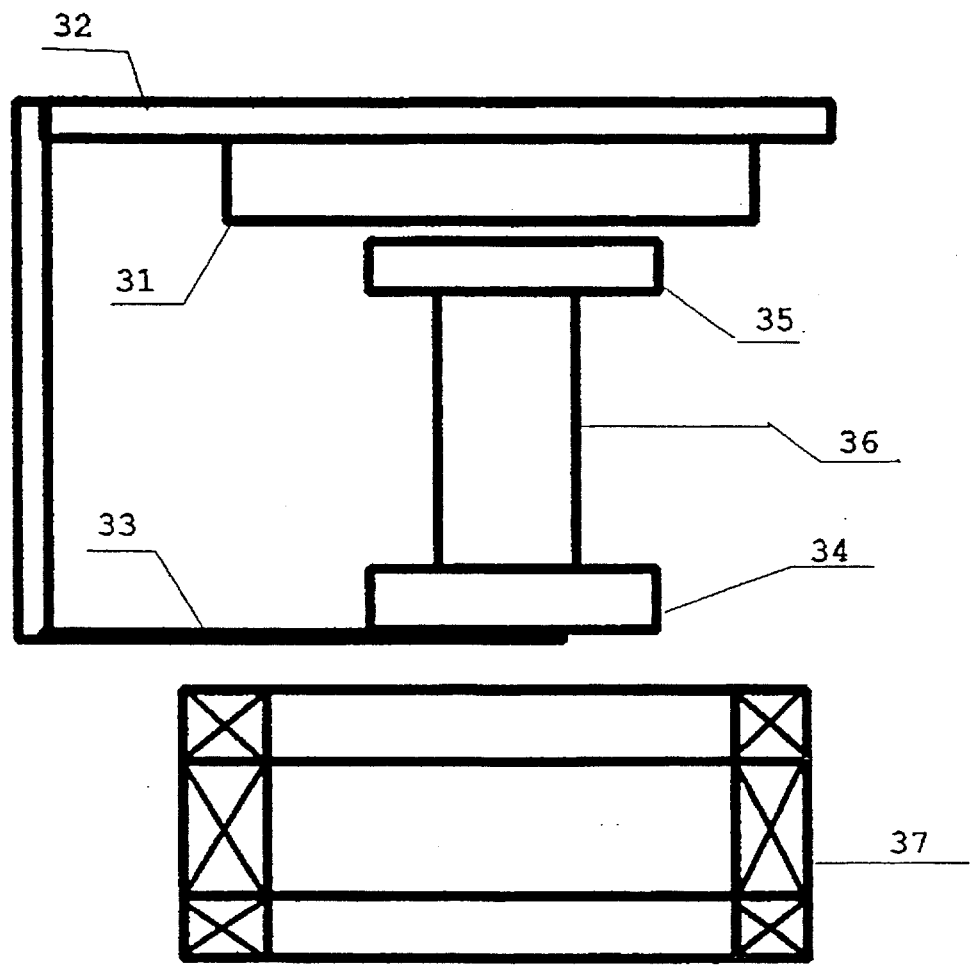
FIG. 3 is a sketch of a damping simulation apparatus.
Figure 4:
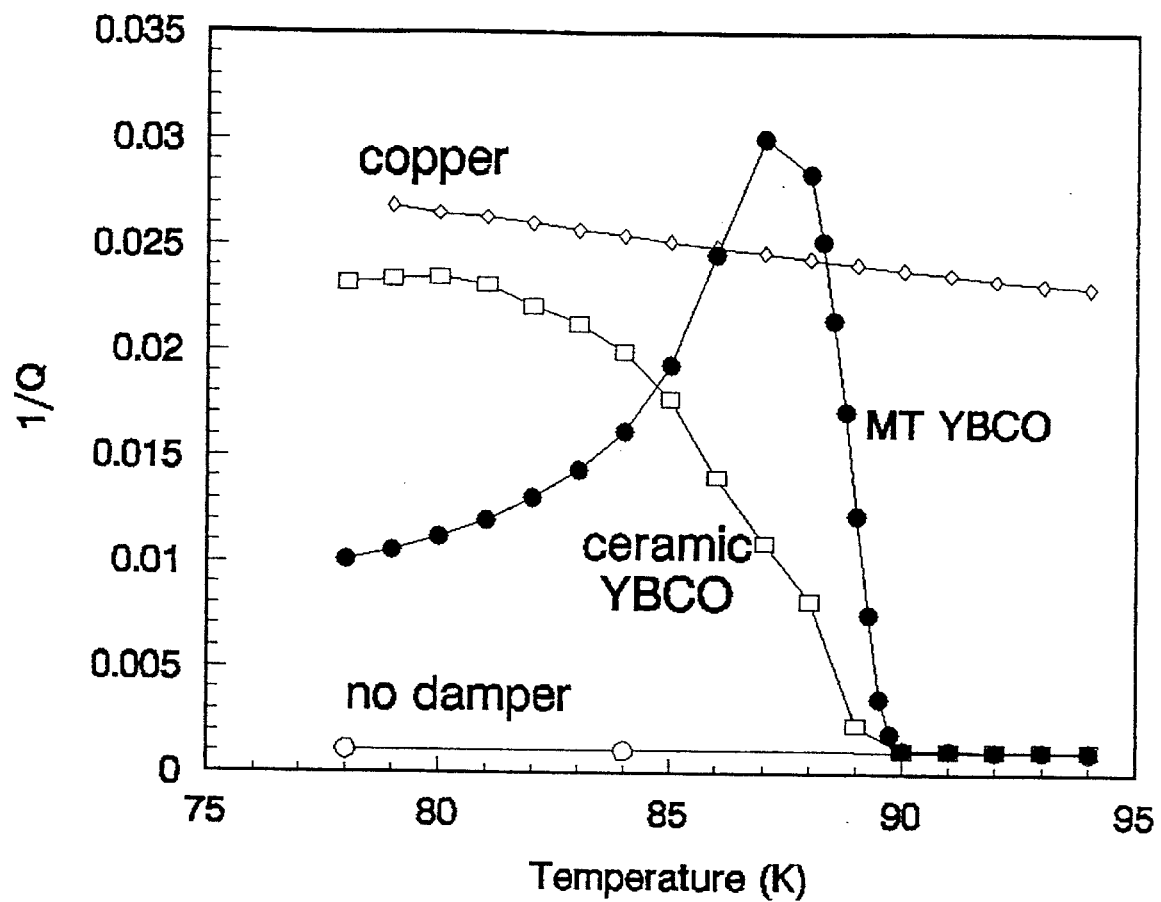
FIG. 4 is a graph illustrating damping of the system of FIG. 3.

In the second experiment, as shown in FIG. 3, a 15 g melt textured YBCO damping element 31 was mounted on a rigid temperature controlled platform 32, having a cantilevered metal bar 33 dependent therefrom and parallel thereto. Two small magnets 34, 35 interconnected with an epoxy spacer 36 were mounted on the metal bar 33 so as to form a mechanical oscillator with a resonance at 90 Hz. The lower drive magnet 34 was placed adjacent to a drive coil 37 having a pick up coil 38 and a compensation coil 39 connected in opposition to each other to form a gradiometer, the output voltage from which gave a measure of the amplitude of the motion of the magnet. The upper magnet 35 was placed adjacent the YBCO damping element 31, and the drive current frequency was swept through the mechanical resonance and the amplitude and width of the resonance response was measured. The experiment was repeated with no damping element 31, a copper disc, and commercial ceramic YBCO as well as the melt textured YBCO. The results are shown in FIG. 4. Dissipation is shown in the form of $$Q^{-1} = \frac{\Delta \omega}{\omega_o}$$

where $\Delta \omega$ is the full-width at half-maximum and $\omega_o$ the resonance frequency. With no damper the Q value was about 1000, limited by the metallic components in the cryostat. Copper lowered this to about 40, providing effective damping; however, it is fixed damping. The ceramic YBCO material shows increased damping below 90K but the damping remained high, even down to 77K, reflecting the low jc (critical current density) of this material. The melt processed YBCO material again shows the sharp peak in damping capacity at about 87–89K.

Figure 5:
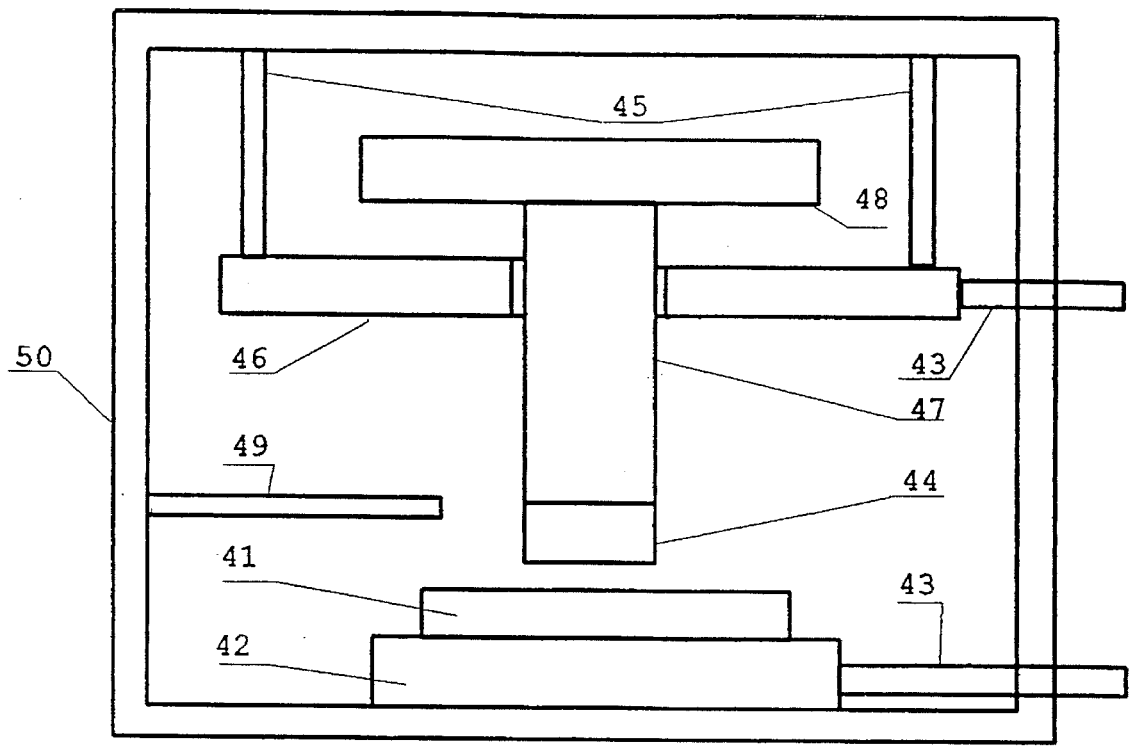
FIG. 5 is a sketch of a magnetic levitation bearing incorporating the present invention.
Figure 6:
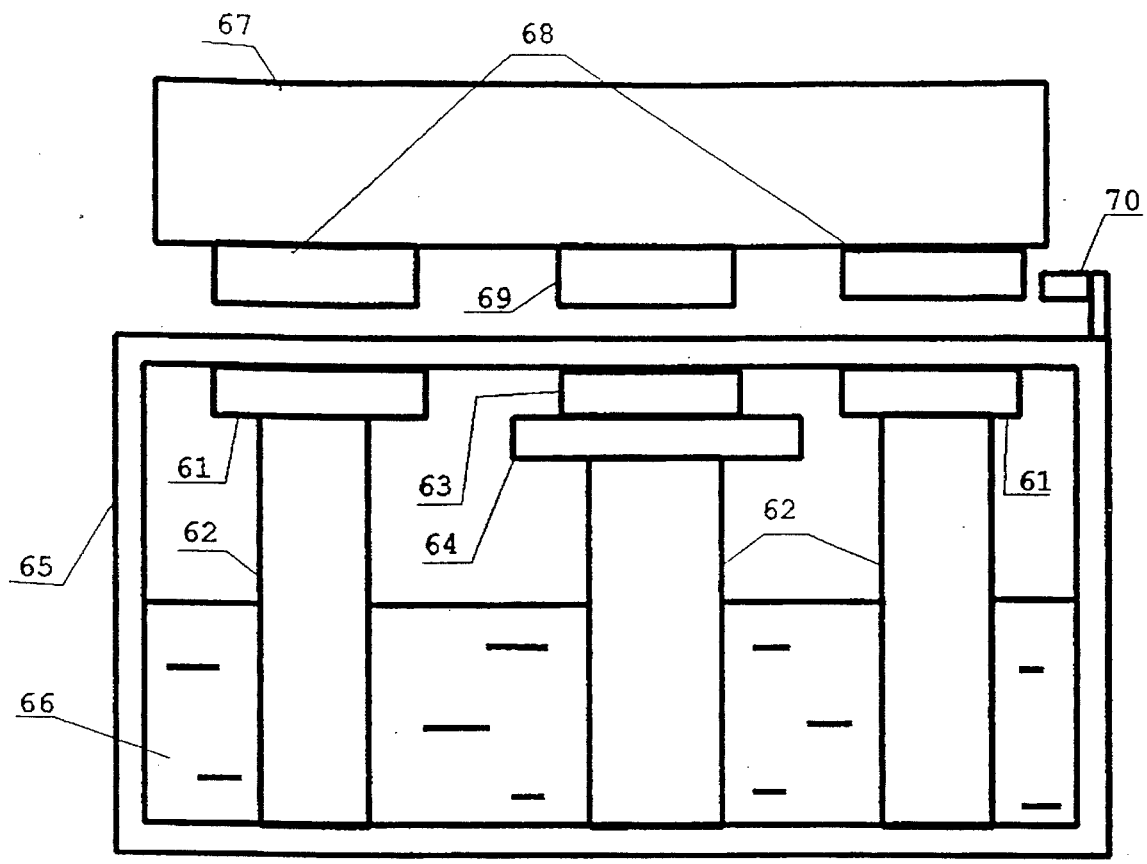
FIG. 6 is a sketch of an alternative embodiment of the magnetic bearing of FIG. 5.

Present magnetic levitation bearings with their high stiffness tend to behave like springs in the absence of sufficient damping. In accordance with the present invention, however, a high Tc damping element can easily be added to a conventional magnetic levitation bearing. Attention is now directed to two alternative embodiments shown schematically in FIGS. 5 and 6. In FIG. 5 there is shown a conventional magnetic levitation bearing, comprising a shaft 47, a large permanent magnet rotor 48 mounted thereon and supported by a stator, which may be but is not necessarily a superconducting stator, 46 supported by supports 45. In accordance with the present invention shaft 47 is extended and provided with a second permanent magnet 44 at the end thereof. In the embodiment shown in FIG. 5 the shaft 47 and magnet 48 are contained in an evacuated double walled insulating vessel 50 and maintained at a temperature of about 77K, which is well below the transition temperature to the superconducting state, using liquid nitrogen. A high Tc superconductor 41, preferably YBCO, is mounted on a thermally conducting, electrically insulating block 42, preferably a sapphire block through which liquid nitrogen can be circulated from a source 43. A vibration sensor 49 is placed adjacent to magnet 44 to sense vibrations in shaft 52 and activate the heating or cooling of shaft 52 as required. In order to effect damping, plate 42 and element 41 are raised to a temperature in the range 86–91K to switch off damping, plate 42 is allowed to cool to 77K. As will be appreciated a small external oscillating force can induce high amplitude vibration in the levitated magnet rotor 45, especially at the resonance frequencies of the bearing, which can lead to loss of stability of the rotor 45, change of the equilibrium position and even to the destruction of the bearing. Assuming that a bearing of this type is used in a high Tc superconducting flywheel energy storage application, it will be appreciated that high damping is necessary during the acceleration phase when the rotating frequency of the wheel passes by the resonance (critical) frequencies. High damping will substantially reduce the amplitude of vibration of the rotor at these critical frequencies. However, when the wheel reaches operating speed and is essentially in equilibrium, the damping must be low in order to prevent the dissipation of the energy stored in the rotor. Therefore, by controlling the temperature of sapphire plate 42, the temperature of the superconducting element can be raised or lowered so as to switch on or switch off the damping effect as required. As can be seen from FIGS. 2 and 4, changing the temperature of YBCO element 41 by only 1K is all that is necessary. Increasing the temperature of the superconductor from 90K to 91K suppresses the dissipation practically to zero. This is because of the strongly non-linear temperature dependence of the resistivity of the YBCO superconductor. Similar considerations apply with respect to the embodiment shown in FIG. 6. Shaft 67, or other levitated body such as a block or translational bearing, which may be at room temperature, is provided with relatively large permanent magnet or magnets 68, the shape of which may be annular or longitudinal depending on the application. Adjacent thereto but spaced therefrom by a distance between about 1 and about 7 mm, preferably about 1–2 mm, there is provided a double walled vacuum vessel, or Dewar flask, 65. Preferably vessel 65 is made of austenitic stainless steel, each wall being less than 0.5 mm thick. Vessel 65 contains complementary superconductor elements 61 mounted on thermal links 62 which can rapidly transfer heat to or from elements 61. Shaft 67 is also provided with an additional, relatively small permanent magnet 69 and a complimentary high Tc superconducting element, preferably YBCO, 63 is provided in close proximity thereto inside vessel 65. Element 63 is mounted on a temperature controllable platform 64, preferably a sapphire platform through which liquid nitrogen can circulate. Platform 64 is also mounted on a thermal link 62. Vessel 65 provides a reservoir for a relatively large volume of liquid nitrogen 66 at 77K. A vibration sensor 70 is provided adjacent permanent magnets 68 to sense vibrational movement in shaft 67 and activate or deactivate the heating and cooling means controlling the temperature of platform 64 and element 63 so as to switch on or switch off the damping effect as previously described. Note that in this embodiment the permanent magnets 68, 69 may be room temperature whereas the superconducting elements 61 and 63 are maintained at a temperature of about 77K.

While this invention has been described with particular reference to magnetic levitation devices, it will be appreciated by those skilled in the art, that the principles of this invention are equally applicable to damping vibrations in a wide range of other devices and structures, such as oscillating beams, optical tables and other vibrator isolation tables.

We claim:

1. A method for damping vibrations in a structure comprising the steps of:

incorporating a high Tc superconducting element into said structure; sensing said vibrations and controlling temperature in said superconducting element in a temperature range corresponding to an energy dissipation peak which is below a transition temperature to a superconducting state, in response to said sensing step.

2. A method as claimed in claim 1 wherein said superconducting element is a melt textured YBCO element and said temperature range is 86–91K.

3. A method as claimed in claim 1 Wherein said structure is a magnetic levitation bearing.

4. A method as claimed in claim 3 wherein said temperature is controlled in said range during acceleration of said bearing and uncontrolled when said bearing reaches a steady state.

5. A system for damping mechanical vibrations in a structure comprising:

permanent magnet means mounted on said structure;

a high Tc superconducting element mounted adjacent said permanent magnet;

heating and cooling means in thermal contact with said superconducting element;

means to generate signals representative of mechanical vibrations in said structure;

means to activate said heating and cooling means in response to said signals to thereby control said superconducting element in a temperature range below the Tc of said element corresponding to an energy dissipation peak for said element, so as to rapidly dissipate vibrational energy from said structure.

6. A damped magnetic levitation bearing system in a vacuum vessel comprising:

a rotatable member having a rotation axis in a central shaft, said shaft having a first permanent magnet rotor mounted thereon and supported by an adjacent first superconducting stator element in spaced relation thereto;

second permanent magnet means mounted on at least one end of said shaft;

a high Tc second superconducting element mounted, in spaced relationship to said second permanent magnet means, on thermally conducting, electrically insulating mounting means;

heating and cooling means in thermal contact with said mounting means;

means to detect mechanical vibrations in said shaft and generate a signal representative thereof;

and means to activate said heating and cooling means in response to said signal so as to control said second superconducting element in a temperature range, below the Tc of said second superconducting element, corresponding to an energy dissipation peak for said second superconducting element, so as to rapidly dissipate vibrational energy from said structure.

7. A system as claimed in claim 6 wherein said vacuum vessel has a vacuum pressure of less than $10^{-4}$ Torr.

8. A system as claimed in claim 6 wherein said second superconducting element is a melt textured YBCO element.

9. A system as claimed in claim 6 wherein said mounting means comprise sapphire plate means.

10. A damped magnetic levitation system comprising:

a levitated platform means;

first permanent magnet means mounted on said levitated platform means;

a cryogenic vessel arranged adjacent but spaced said first permanent magnet means;

and containing first superconducting means in spaced overlying relationship to said first permanent magnet means so as to provide a lifting force for said platform means;

said first superconducting means being mounted on thermal link means in said vessel;

second permanent magnet means mounted on said platform means;

high Tc second superconducting means in said vessel arranged in overlying spaced relationship to said second permanent magnet means, mounted on a thermally conducting electrically insulating mounting means which in turn is mounted by a thermal link in said vessel;

means to heat and cool said thermally conducting and electrically insulating mounting means;

means to detect mechanical vibrations in said levitated platform and generate a signal representative thereof; and means to activate said heating and cooling means in response to said signal so as to control said second superconducting element in a temperature range, below the Tc of said second element, corresponding to an energy dissipation peak for said second superconducting element, so as to rapidly dissipate vibrational energy from said levitated platform.

11. A system as claimed in claim 10 wherein said cryogenic vessel contains liquid nitrogen at less than 86K.

12. A system as claimed in claim 10 wherein said second superconducting element is a melt textured YBCO element.

13. A system as claimed in claim 9 wherein said thermally conducting, electrically insulating mounting means comprises sapphire plate means.

14. A system as claimed in claim 5 wherein said high Tc superconducting element is selected from the group consisting of YBCO, BSCCO and Thallium or Mercury copper oxide compounds.

15. A system as claimed in claim 14 wherein said superconducting element is a melt textured YBCO.

16. A system as claimed in claim 15 wherein said temperature range is between 86 and 91K.

* * * * *